(12) United States Patent
Jeng et al.

(10) Patent No.: US 7,982,591 B2
(45) Date of Patent: Jul. 19, 2011

(54) SYSTEM AND METHOD FOR DETECTING SURROUNDING ENVIRONMENT

(75) Inventors: Shan-Chuan Jeng, Hsinchu (TW); Hsieh-Tai Su, Hsinchu (TW); Long-Tai Chen, Hsinchu (TW); Chih-Che Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 284 days.

(21) Appl. No.: 12/391,349

(22) Filed: Feb. 24, 2009

(65) Prior Publication Data

US 2010/0164706 A1 Jul. 1, 2010

(30) Foreign Application Priority Data

Dec. 30, 2008 (TW) ................................ 97151333 A (51) Int. Cl.
*B60Q 1/00* (2006.01)

(52) U.S. Cl. .................. 340/436; 340/425.5; 340/435; 340/438; 701/301

(58) Field of Classification Search .................. 340/436, 340/425.5, 435, 438; 345/1.1, 3.1; 701/300, 701/301

See application file for complete search history.

(56) References Cited

U.S. PATENT DOCUMENTS

| | | | | |
|---|---|---|---|---|
| 5,699,057 A * | 12/1997 | Ikeda et al. | .................. | 340/937 |
| 5,786,772 A * | 7/1998 | Schofield et al. | ............. | 340/903 |
| 6,753,766 B2 * | 6/2004 | Patchell | ....................... | 340/436 |
| 7,079,017 B2 * | 7/2006 | Lang et al. | ................... | 340/435 |
| 7,110,021 B2 | 9/2006 | Nobori et al. | | |
| 7,378,947 B2 | 5/2008 | Daura Luna et al. | | |
| 7,382,240 B2 * | 6/2008 | Egelhaaf | ....................... | 340/461 |
| 7,741,962 B2 * | 6/2010 | Kalik | ............................. | 340/438 |
| 7,876,203 B2 * | 1/2011 | Traylor et al. | ................. | 340/435 |
| 2005/0073433 A1 * | 4/2005 | Gunderson et al. | ........... | 340/903 |
| 2008/0147321 A1 * | 6/2008 | Howard et al. | ............... | 701/211 |

FOREIGN PATENT DOCUMENTS

| TW | I294371 | 3/2008 |
|---|---|---|
| TW | I305829 | 2/2009 |

* cited by examiner

*Primary Examiner* — Toan N Pham
(74) *Attorney, Agent, or Firm* — Rabin & Berdo, P.C.

(57) ABSTRACT

A system and method applicable to a vehicle for detecting a surrounding environment are provided. The system and method include installing primary and secondary display units in a vehicle; installing a plurality of detectors of various types around the vehicle; detecting obstacles around the vehicle using the plurality of different detectors; generating and outputting first detector data to be received by a primary control module; generating second detector data by integrating data to generate and transmit a primary warning message including vehicle positional information relative to the obstacle and a secondary warning message comprising obstacle positional information to the primary and secondary display units respectively for display. The system and method enable accurate detection of an obstacle via the warning messages and improved driving safety, using detectors with functions different from and complementary to one another.

33 Claims, 4 Drawing Sheets

SYSTEM AND METHOD FOR DETECTING SURROUNDING ENVIRONMENT

BACKGROUND OF THE INVENTION

1. Field of the Invention

The present invention relates to a system and method for detecting a surrounding environment, and more particularly, to a system and method being applied to a vehicle and using a primary display unit, a plurality of secondary display units and different types of detectors for detecting a surrounding environment.

2. Description of Related Art

There are many types of detectors that can be used on vehicles to detect a surrounding environment, such as image detectors, supersonic radars, optical laser radars, millimeter wave/microwave radars and infrared radars. The most commonly used among them are supersonic radars for preventing a vehicle from bumping by short distance detection at parking. Besides, image detectors are becoming more popular, as they can accurately display the types and positions of nearby objects in the surroundings. Optical laser radars have the longest detection distance and thereby provide positional measurement that is yet the most accurate. The application of millimeter wave/microwave radars has been the widest so far. Their detection ranges can be adjusted accordingly and be working at either low or high speed of movement. Among all, infrared radars provide the most precise angular measurement.

However, the conventional detectors have their drawbacks. For instance, supersonic radars can only be used at slow speed, like parking a vehicle, because the sound velocity is low and susceptible to Doppler effects. Optical laser radars tend to be affected by unfavorable weather conditions such as rains or fogs. Image detectors, on the other hand, require a complicated calculation to obtain the information, and still have room for improvement in errors. Therefore, in practice, each type of the detectors has its own limits.

In addition, the detected data depend on the position of the detector in a vehicle. For example, detectors installed in the front of the vehicle may acquire different measurements as detecting the same object before the vehicle depends on whether the detectors are mounted on the central axis of the vehicle or near the headlights, even though the detectors are of the same properties and adopt the same media for detection. It is because the detector installation positions relative to the object position are different. Furthermore, different types of detectors by using various detection media and applying principles will result in different forms of data. For instance, the obstacle data collected by infrared radars only provide two-dimensional information while those collected by millimeter wave/microwave radars provide three-dimensional information.

Figure 1:
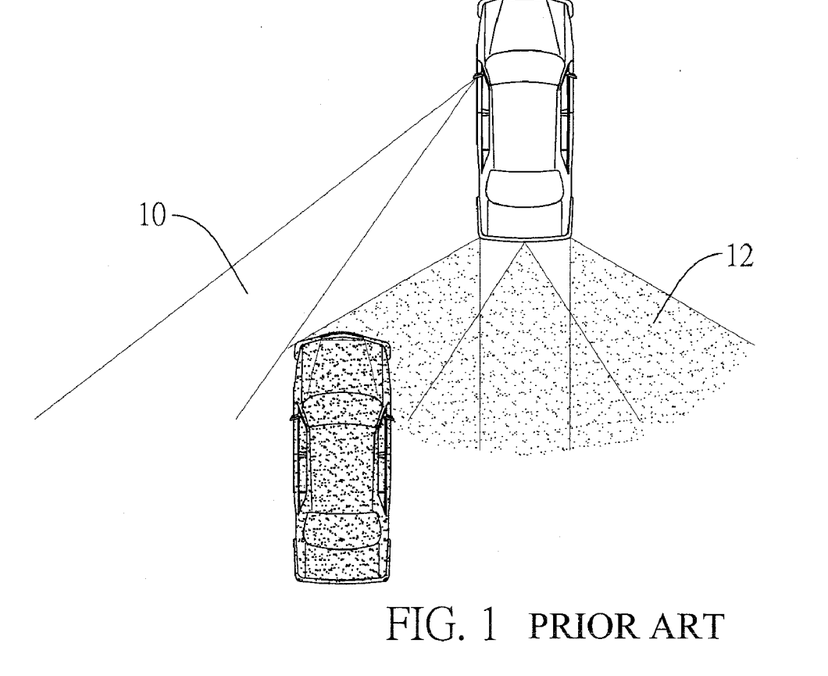
FIG. 1 (PRIOR ART) is a conventional method for detecting a surrounding environment.

It is difficult to combine different types of detectors because each has its specific application conditions. In prior arts, a certain type of detectors is usually only responsible for a certain application. Referring to FIG. 1, a conventional vehicle takes advantage of supersonic radars to extend the detectable range of wing mirrors 10 with the radar coverage 12. However, owing to the drawbacks described above, any single type of detectors can neither provide accurate measurements nor meet the various requirements of driving conditions.

As a result, it is desirable to design a system for detecting a surrounding environment, which is achieved by the combination of functions of different types of detectors complementary to one another. The system integrates the detected data of different types of detectors and obtains the accurate positions of target obstacles.

SUMMARY OF THE INVENTION

In an aspect of the present invention, a system and method for detecting a surrounding environment is feasible and practical when provided by data fusion techniques, so as to integrate data collected by different types of detectors.

In another aspect of the present invention, a system and method for detecting a surrounding environment enhance driving safety greatly. It is because the system allows a driver to promptly identify positions of his/her vehicle relative to surrounding obstacles by means of a clear and obvious presentation of collected data from detectors installed on the vehicle.

In another aspect of the present invention, a system and method for detecting a surrounding environment can provide drivers protection proactively by processing collected data to calculate vehicle routes in order to avoid collision with obstacles, and change movement of the vehicle by using the obtained route.

In a nutshell, the present invention provides a system for detecting a surrounding environment of a vehicle, which comprises: a primary display unit installed inside the vehicle; a plurality of secondary display units installed inside the vehicle corresponding to same directions of obstacles being detected; a plurality of different types of detectors installed around the vehicle for detecting obstacle positions around the same vehicle relative to detector positions, on which to generate and output first detector data; and a primary control module, which is being electrically coupled to the primary display unit, the secondary display units and the detectors, for receiving the first detector data and performing data fusion on the first detector data so as to generate second detector data, generating primary warning messages including positional information of the obstacles relative to a center of the vehicle and secondary warning messages including positional information of the obstacles based on the second detector data, and sending, according to the positional information of the obstacles, the primary warning messages to the primary display unit and the secondary warning messages to the secondary display units, wherein the data fusion is performed to convert the positional information of the obstacles relative to the detectors and comprised in the first detector data into the positional information of the obstacles relative to the center of the vehicle.

According to the aforementioned system, the present invention further provides a method for detecting a surrounding environment for a vehicle. The method is for use with a primary control module, and the vehicle is electrically coupled with a plurality of different types of detectors, a primary display unit and a plurality of secondary display units. The secondary display units are installed inside the vehicle at positions corresponding to the directions of obstacles detected. The method comprises the steps of: detecting positions of obstacles around the vehicle and relative to the detectors by the detectors, receiving the first detector data by the primary control module, and performing data fusion on the first detector data by the primary control module so as to generate second detector data, wherein the data fusion is performed to convert the positional information of the obstacles relative to the detectors and comprised in the first detector data into the positional information of the obstacles relative to the center of the vehicle; generating positional information of the obstacles relative to the center of the vehicle as primary warning messages based on the second detector data, wherein the positional information of the obstacles is generated as secondary warning messages; and transmitting the primary warning messages to the primary display unit, and transmitting the secondary warning messages to the second display unit.

In another preferred embodiment, the present invention provides a dynamic controller for controlling movement of a vehicle. The primary control module determines the current direction in which the vehicle moves based on the second detector data and then sends control signals to the dynamic controller in order to make the corresponding changes in movement directions. For example, if the system determines that it is necessary to keep the vehicle at a proper distance from a preceding vehicle, the system will interfere in the driving operations like braking or accelerating. Such auto cruising functions can relieve the drivers' burdens during a long-distance drive.

In a preferred embodiment of the present invention, the primary control module comprises two Internet domain controlling interfaces. One of the Internet domain controlling interfaces receives data from the detectors, and the other sends control commands to the dynamic controller. The primary control module include digital signal transmission interface like UART, I2C and I2S and will send the secondary warning messages to the secondary display units. Each of the detectors has a unique transmission identification number, allowing the primary control module to recognize each of the detectors. Preferably, the intra-vehicular communication network is a CAN bus, and the transmission identification number is a CAN ID.

In a preferred embodiment of the present invention, the detectors are all-embedded detectors that operate by themselves without interference from other computers. Such detectors are much faster than those of the conventional systems, which are not all-embedded detectors, very slow during boot up/shutdown stage and controlled by other computers.

As a result, according to the present invention, the system for detecting a surrounding environment effectively enhances driving safety by combining several technical features: the variety of detectors provides enhanced accuracy in obstacle detection and enhanced adaptability to a vehicle operating environment, compared to conventional detectors of the same type as disclosed in the prior art; presenting the warning messages in a clear and obvious way; and automatic assistant driving.

BRIEF DESCRIPTION OF DRAWINGS

The present invention can be more fully understood by reading the following detailed description of the preferred embodiments, with reference made to the accompanying drawings as follows.

DETAILED DESCRIPTION OF PREFERRED EMBODIMENTS

The specific embodiments are to be described to illustrate the present invention. These and other advantages or effects can be readily appreciated by those skilled in the art after reading the disclosure in the specification. All modifications, equivalents and alternatives can be made without departing from the scope of the present invention as defined by the appended claims.

Figure 2:
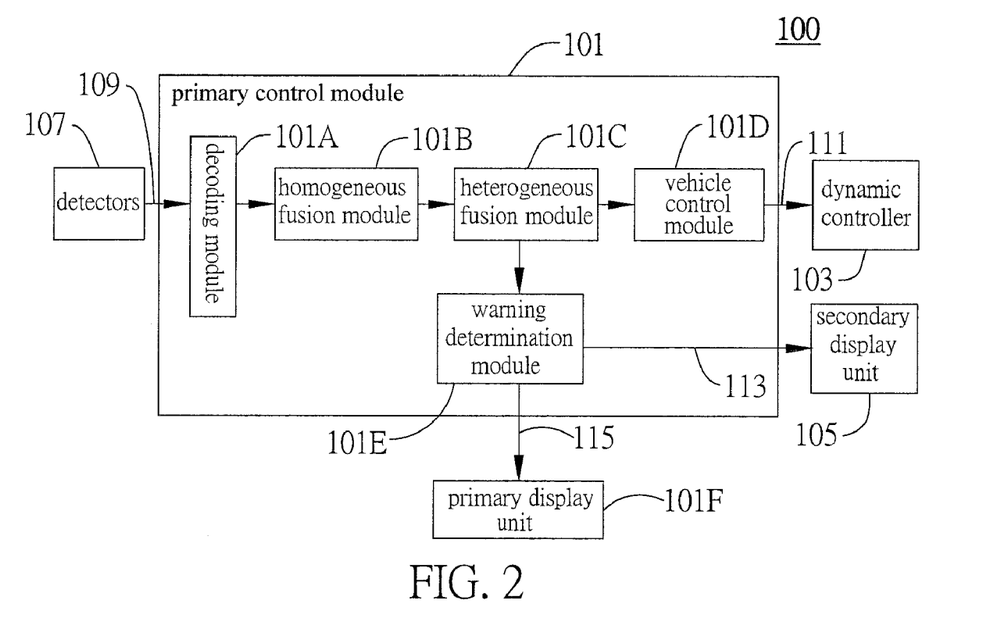
FIG. 2 is a schematic diagram of a system 100 for detecting a surrounding environment, according to a preferred embodiment of the present invention.

FIG. 2 is a schematic diagram of a preferred embodiment of a system 100 for detecting a surrounding environment according to the present invention. The system 100 is used in vehicles and comprises: a primary display unit 101F, a plurality of secondary display units 105, a plurality of detectors 107 of different types, and a primary control module 101. The details of each of the components of the system 100 are described below.

The primary display unit 101F is installed in the vehicle.

The secondary display units 105 are installed on a vehicle at positions corresponding to the directions of obstacles detected. More specifically, the secondary display units 105 can be coupled to the primary control module 101 through a digital signal transmission interface 113 of UART, I2C and I2S to receive the secondary warning messages. The secondary display units 105 display the secondary warning messages to the driver by visual messages like blinkers, or by acoustic messages like a warning sound.

The plurality of detectors 107 of different types are installed around the vehicle to detect positions of the obstacles around the vehicle and relative to the detectors 107, and the collected positional information is processed and outputted as first detector data. More specifically, the detectors 107 are image detectors, supersonic radars, optical laser radars, millimeter wave/microwave radars or infrared radars. Furthermore, the detectors 107 are all-embedded detectors and much faster than those in the conventional systems, which are not all-embedded detectors, very slow during boot up/shutdown stage and are controlled by other computers. The detectors 107 require no host computer and yet can operate independently by operating in conjunction with associated circuits (not shown).

The primary control module 101 is electrically coupled to the primary display unit 101F, the secondary display units 105 and the detectors 107 in order to receive the first detector data and perform data fusion on the first detector data so as to generate the second detector data. Based on the second detector data, positional information of the obstacles relative to the center of the vehicle is transmitted to the primary display unit 101F and displayed as primary warning messages, while the positional information of the obstacles is transmitted to the secondary display units 105 and displayed as secondary warning messages. The data fusion is performed to convert the positional information of the obstacles relative to the detectors and comprised in the first detector data into the positional information of the obstacles relative to the center of the vehicle.

Besides, the detectors 107 and the primary control module 101 can be coupled together by an intra-vehicular communication network 109, like a CAN bus. Each of the detectors 107 has a unique transmission identification number (e.g. CAN ID) so that detectors 107 can be connected to the intra-vehicular communication network 109 in parallel and thereby can communicate with the primary control module 101 concurrently.

The primary control module 101 comprises: a decoding module 101A, a homogeneous fusion module 101B, a heterogeneous fusion module 101C, a vehicle control module 101D, and a warning determination module 101E. The details of each of the components of the primary control module 101 are described below.

The decoding module 101A receives the first detector data collected by the detectors 107. Based on the transmission identification number (e.g. CAN ID) of each of the detectors 107, the detection data are classified and decoded as first detector data and are sent to the homogeneous fusion module 101B.

The homogeneous fusion module 101B fuses the first detector data according to the data types, wherein the detection data of the same data type are those collected by the detectors using the same detection media and natural laws. Each entry of the detection data is categorized into a certain group by the homogeneous fusion module 101B. For example, data from the supersonic radars belong to one group, and data from the millimeter wave/microwave radars belong to another group. Resultant data created by the data fusion are always expressed in the same world coordinates employed by the relative positional information between the default center of the vehicle and the corresponding obstacles. The first detector data fused in the form of data groups are referred to as heterogeneous first detector data.

The heterogeneous fusion module 101C receives the heterogeneous first detector data from the homogeneous fusion module 101B, fuses them to generate the second detector data. The data fusion for the heterogeneous detection data is to map the heterogeneous detection data into the same space as that corresponding to the world coordinates of drivers' location, and the data reliability can be enhanced by combination of different types of detectors with complementary functions. For example, infrared radars make precise detection of target heat source and angular tracing but are not suitable for detecting the distance, while millimeter wave/ microwave radars can make precise detection of target distance with the capability of radiating electromagnetic waves. When combining the functions of these two types of detectors, the obstacle detection can be more effective. More particularly, the data fusion of the heterogeneous detection data involves the interactive multimode combination data association algorithm and the extended Kalman filtering probability data association algorithm, etc. Because these algorithms are not the subjects of the present invention, they will not be described in detail here for clarity.

The second detector data that have been processed by the homogeneous fusion module 101B and heterogeneous fusion module 101C are sent to the vehicle control module 101D and warning determination module 101E, respectively, for further analysis.

Figure 4A:
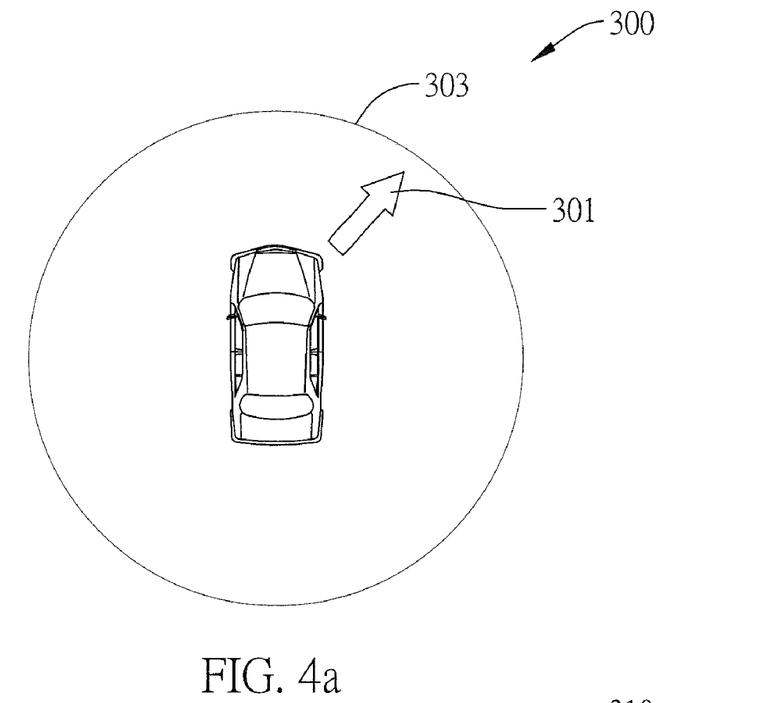
FIG. 4a is a radar chart of a primary display unit 101F.
Figure 4B:
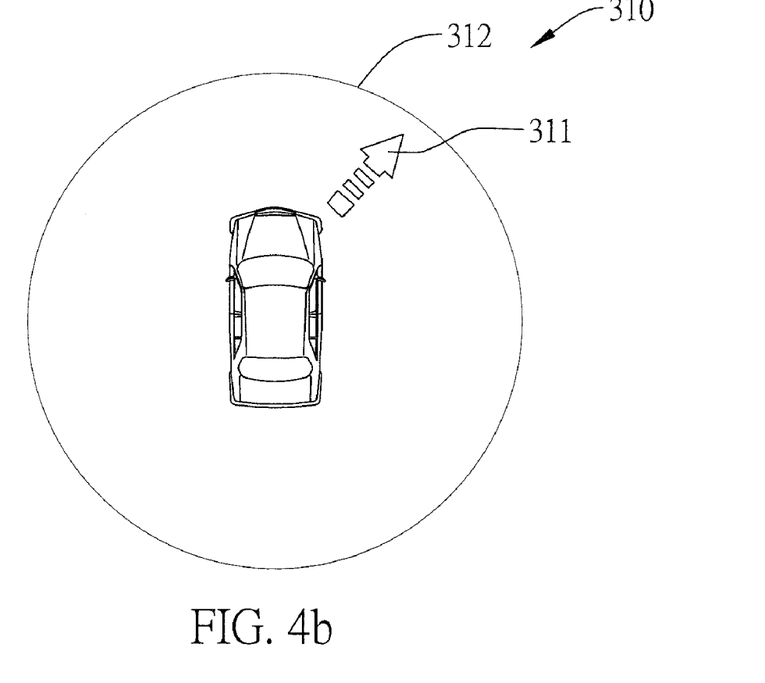
FIG. 4b is another radar chart of the primary display unit 101F.

The warning determination module 101E receives the processed second detector data and determines whether to give the driver warning of any looming obstacles that can put the vehicle in danger then prompts the driver to take proper actions. There are two types of prompts. One is that the warning determination module 101E sends the primary warning message to the primary display unit 101F for display, by means of a video output interface 115 that conforms to the standards of digital/analog video output interface. The primary display unit 101F, like a LCD, can warn the driver of incoming obstacles by displaying radar charts 300 and 310 shown in FIG. 4a and FIG. 4b respectively, or by warning sounds like human voice. The other kind of prompts is that the warning determination module 101E sends the secondary warning messages to the secondary display units 105 through the digital signal transmission interface 113 of UART, I2C and I2S. The secondary display units 105 manifest the warning messages in sounds or blinkers in order to warn the driver.

In addition, the primary control module 101 further comprises an adaptive cruising control switch (not shown). When the vehicle control module 101D receives the processed second detector data and the driver turns on the cruising control switch, the vehicle control module 101D will start to calculate the braking system control logic. The braking system control logic will perform cross-link calculation for the vehicle motion information like speed and direction with the obstacle positional information from detectors to obtain the optimal positional information (e.g. the distance), thereby determining the proper vehicle speed to keep the most appropriate safe distance from the obstacle. The corresponding control signals are then sent to a dynamic controller 103 via an intra-vehicular communication network 111. The dynamic controller 103 performs functions like braking or accelerating according to the control signals. More specifically, the dynamic controller 103 is coupled to the primary control module 101 through the intra-vehicular communication network 111 like a CAN bus. The dynamic controller 103, like a braking controller or a throttle controller, controls the vehicle operations and can change the direction in which the vehicle moves. Furthermore, the primary control module 101 has two Internet domain controlling interfaces (not shown), wherein one of the Internet domain controlling interfaces receives data from the detectors 107 and the other said Internet domain controlling interface sends control commands to the dynamic controller 103.

The warning determination module 101E utilizes the obstacle positional information to determine which of the secondary display units 105 should display the secondary warning message. For example, if the obstacle is on the left of the vehicle, the warning determination module 101E will send the secondary warning message to the corresponding one of the secondary display units 105 on the left of the vehicle. Since the secondary display units 105 are in the same directions of the obstacles being detected, drivers can directly recognize the directions of the obstacles. It is particularly useful for the drivers when changing lanes because the nearby obstacles are not ignored due to the limits of an angle of view. It should be understood that the detectable range and applicable driving conditions are much broader according to the present invention. It is because different types of detectors are adopted by the surrounding environment detection system 100 so the performance, accuracy and reliability are much higher than those of prior arts.

Figure 3:
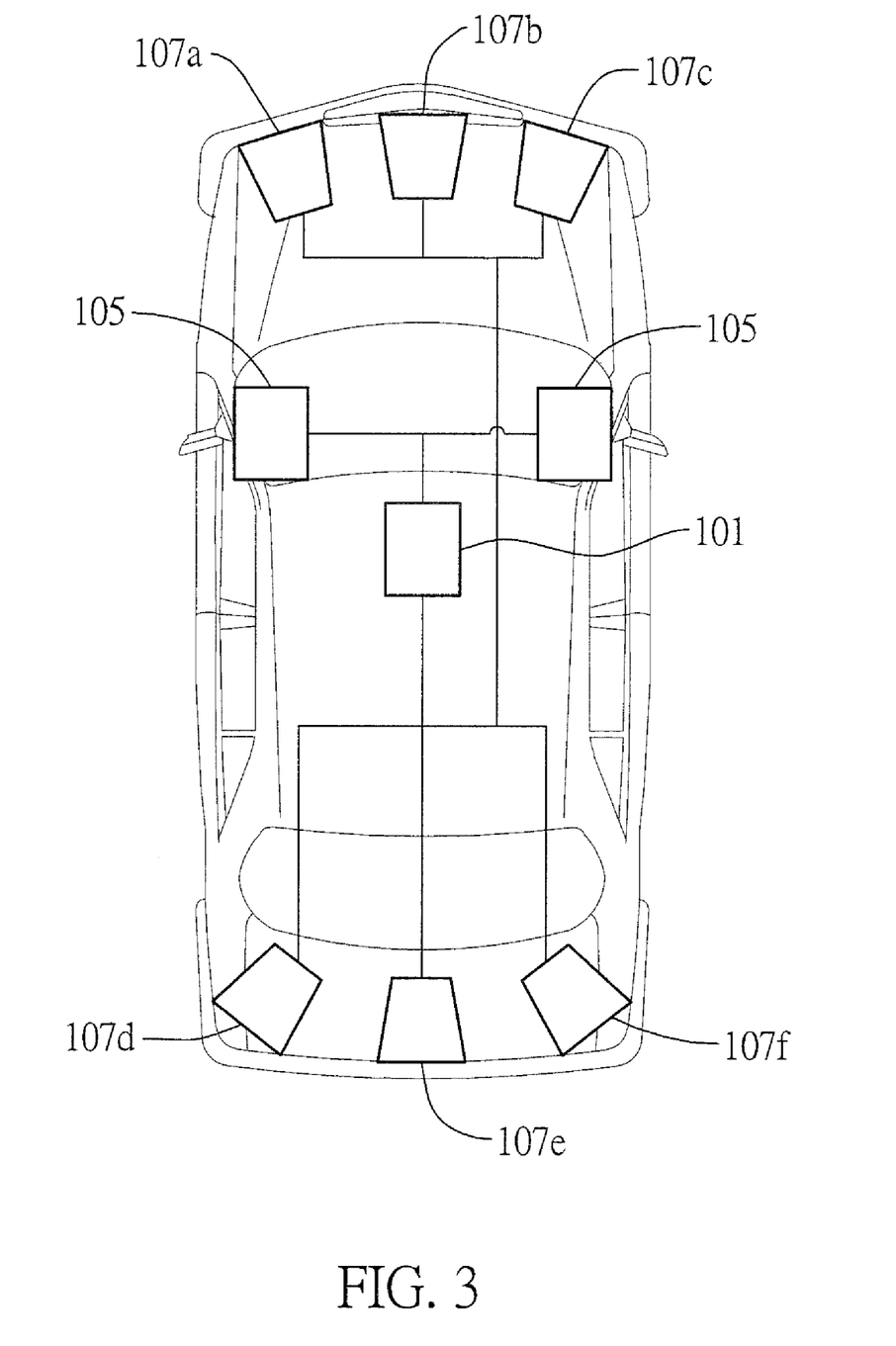
FIG. 3 is a schematic diagram of installation of the system 100 on a vehicle, according to a preferred embodiment of the present invention.

FIG. 3 shows a preferred embodiment of the system 100 according to the present invention. A plurality of detectors 107a, 107b, 107c, 107d, 107e, 107f are installed around a vehicle to detect positions of the obstacle around the vehicle and relative to the detectors. The first detector data are generated based on the detected positional information. The secondary display units 105 are installed near both wing mirrors. When the secondary display units 105 show the secondary warning messages in blinks or sound, they are eye-catching and can indicate the direction of incoming obstacles. For example, if the obstacles on the right side of the vehicle are detected by the detector 107c, inside the vehicle the secondary display units 105 on the right side will warn the driver with the secondary warning messages.

The primary control module 101 is installed on the dashboard and has a primary display unit 101F facing the driver (not shown). The primary display unit 101F displays radar charts shown in FIG. 4a and FIG. 4b. Circles 303 and 312 stand for the detecting range, while arrows 301 and 311 indicate the directions of the obstacles relative to the vehicle. Within the arrow 301 there is a number indicating the distance between the obstacle and the vehicle. For instance, if the obstacle is 50 meters away from the vehicle, "50 m" will be shown within the arrow 301. Alternately, in the radar chart 310, the length of the arrow 311 represents the distance between the obstacle and the vehicle. The arrow length is long if the distance is long, while the arrow length is short if the distance is short. The arrows can also use colors to present the distance. For example, the colors of the arrows 301 and 311 are green if the distance is long, while the colors of the arrows 301 and 311 become red if the distance is short. The radar charts 300 and 310 controlled by the primary display unit 101F can assist drivers in recognizing the surroundings, for example when the visible distance is short or under bad weather conditions. For clarity, the operations of the secondary display units 105 on the left side are not described here. Please refer to the aforementioned operations for the right side for details.

Figure 5:
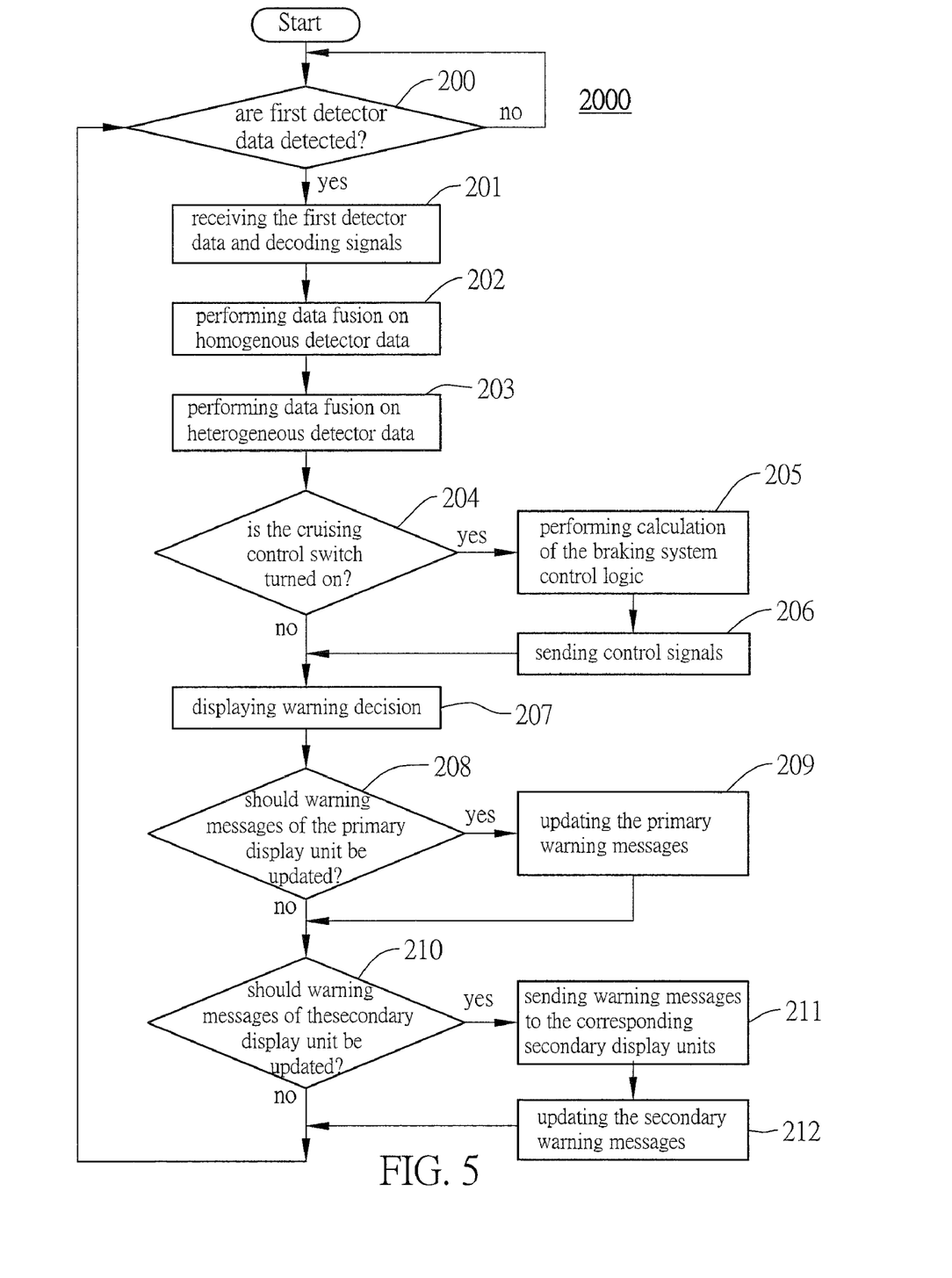
FIG. 5 is a flow chart 2000 of operations in the system 100, according to a preferred embodiment of the present invention.

FIG. 5 shows the operation flow chart 2000 of the system 100 for detecting the surrounding environment according to the present invention. The system 100 starts operating from step 200 shown in the flow chart 2000.

Step 200 determines whether each of the detectors has received the first detector data or not. If yes, the first detector data are sent to the decoding module 101A of the primary control module 101; if not, continue the detection process.

In step 201, upon receipt of the first detector data, the decoding module 101A decodes and classifies the first detector data according to the transmission identification number of each detector. Then, go to step 202.

In step 202, the homogeneous fusion module 101B performs data fusion on the homogeneous first detector data and outputs the results to the heterogeneous fusion module 101C. Then, go to step 203.

In step 203, the heterogeneous fusion module 101C performs data fusion on the heterogeneous first detector data so as to generate second detector data. Then, go to step 204.

In step 204, the primary display unit 101 determines whether the cruising control switch is turned on. If the switch is on, go to step 205, otherwise go to step 207.

In step 205, the vehicle control module 101D performs calculation of the braking system control logic so as to generate the control signals, according to the second detector data. Then, go to step 206.

In step 206, the vehicle control module 101D sends the obtained control signals to the dynamic controller 103 via an intra-vehicular communication network 111 so as to control the vehicle movement. Then, go to step 207.

In step 207, the warning determination module 101E determines whether the primary display unit 101F and/or specific said secondary display units 105 should display the warning messages as well as the corresponding graphs or sounds from the primary control module 101, according to the second detector data. Then, go to step 208.

In step 208, the warning determination module 101E determines whether the warning messages of the primary display unit 101F should be updateed, namely to be updated with the new warning messages, according to the results of step 207. If yes, go to step 209, otherwise go to step 210.

In step 209, the warning determination module 101E sends the primary warning messages to the primary display unit 101F so as to update the warning graphs/sounds of the primary display unit 101F. Then, go to step 210.

In step 210, the warning determination module 101E determines whether the warning messages of the secondary display units 105 should be updateed, according to the results of step 207. If yes, go to step 211, otherwise go back to step 200.

In step 211, the warning determination module 101E sends the secondary warning messages to the corresponding secondary display units 105 that are in the same directions of the obstacles. Then, go to step 212.

In step 212, the secondary display units 105 are updated by the new secondary warning messages. Then, go back to step 200.

In conclusion, the present invention provides a system 100 and method for detecting a surrounding environment and integrating different types of detectors to detect the obstacles around a vehicle. Compared to the prior art, the present invention overcomes the difficulty in combining different types of detectors and achieves optimal detection performance. As a result, driving safety is greatly enhanced.

Moreover, the detector data collected by all detectors are fused according to the present invention and display the position of an obstacle relative to the center of the vehicle. The driver need not do any conversion calculations but is informed of the obstacle position accurately. The system according to the present invention also benefits from the combination of different types of detectors with complementary functions and thus it provides accurate measurement and meets the requirements of various driving conditions.

In addition, when the vehicle is approaching the obstacles, the driver can recognize the obstacle positions more intuitively without reading texts or images and thus the driver's response time is shortened, because the secondary display units display visual or acoustic messages sent in the directions of the obstacles. Also, the radar charts assist the driver in recognizing dim surroundings.

What is claimed is:

1. A system applicable to a vehicle for detecting a surrounding environment, comprising:
 a primary display unit disposed in the vehicle;
 a plurality of secondary display units disposed in the vehicle and corresponding in direction to obstacles to be detected;
 a plurality of different types of detectors disposed around the vehicle for detecting positions of the obstacles around the vehicle and relative to the detectors, generating and outputting first detector data according to the positions detected; and
 a primary control module electrically connected to the primary display unit, the secondary display units and the detectors, and configured for receiving the first detector data, performing data fusion on the first detector data received so as to generate second detector data, generating primary warning messages including positional information of a center of the vehicle relative to the obstacles and secondary warning messages including positional information of the obstacles according to the second detector data, sending the primary warning messages to the primary display unit to display the primary warning messages thereon, and sending the secondary warning messages to the secondary display units corresponding thereto, respectively, to display the secondary warning messages thereon according to the positional information of the obstacles,
 wherein the data fusion is performed to convert the positional information of the obstacles relative to the detectors and comprised in the first detector data into the positional information of the obstacles relative to the center of the vehicle, wherein the data fusion further comprises homogeneous fusion performed on the first detector data attributable to same detection media and same detection principles, and heterogeneous fusion performed on the first detector data attributable to different detection media and different detection principles.

2. The system of claim 1, wherein the primary and secondary warning messages are visual messages or acoustic messages.

3. The system of claim 1, wherein the primary warning messages are radar charts.

4. The system of claim 3, wherein distances between the vehicle and the obstacles are denoted by colors in the radar charts.

5. The system of claim 3, wherein distances between the vehicle and the obstacles are denoted by numbers in the radar charts.

6. The system of claim 1, further comprising a dynamic controller coupled to the primary control module to control an operation of the vehicle, wherein the primary control module determines a movement direction of the vehicle based on the second detector data and sends controlling signals, according to the movement direction of the vehicle, to the dynamic controller so as to change the movement direction of the vehicle.

7. The system of claim 6, wherein the dynamic controller is connected to the primary control module through an intra-vehicular communication network.

8. The system of claim 6, wherein the movement direction of the vehicle is determined by a neural-like network model.

9. The system of claim 6, wherein the primary control module further comprises:
two Internet domain controlling interfaces for receiving data from the detectors and sending control commands to the dynamic controller, respectively.

10. The system of claim 1, wherein the detectors are selected from the group consisting of image detectors, supersonic radars, optical laser radars, millimeter wave/microwave radars and infrared radars.

11. The system of claim 1, wherein the primary control module further comprises a digital signal transmission interface of UART, I2C and I2S for sending the secondary warning messages to the secondary display units.

12. The system of claim 1, wherein the primary control module further comprises an intra-vehicular communication network for sending and receiving the first detector data.

13. The system of claim 12, wherein each of the detectors has a unique transmission identification number for the primary control module to recognize each of the detectors.

14. The system of claim 13, wherein the intra-vehicular communication network is a CAN bus, and the transmission identification number is a CAN ID.

15. The system of claim 1, wherein the primary warning messages are displayed on the primary display unit by means of a display output interface of a digital or an analog video.

16. The system of claim 1, wherein the secondary warning messages are displayed on the secondary display unit by means of a display output interface of a digital or an analog video.

17. The system of claim 1, wherein the detectors are all-embedded detectors requiring no host computer to operate.

18. A method for detecting a surrounding environment for a vehicle, wherein the vehicle is equipped with primary control module, a plurality of different types of detectors, a primary display unit, and a plurality of secondary display units respectively electrically connected to the primary control module, wherein the secondary display units are disposed in the vehicle at positions corresponding to directions of obstacles to be detected, the method comprising the steps of:
detecting by the detectors positions of obstacles around the vehicle and relative to the detectors, generating and outputting by the detectors first detector data according to the detected positions of obstacles;
receiving the first detector data by the primary control module, performing data fusion on the first detector data by the primary control module to generate second detector data, wherein the data fusion is performed to convert positional information of the obstacles relative to positions of the detector into that relative to a center of the vehicle;
generating, according to the second detector data, primary warning messages comprising the positional information of the obstacles relative to a center of the vehicle, and secondary warning messages comprising the positional information of the obstacles; and
transmitting the primary warning messages to the primary display unit, and transmitting the secondary warning messages to the second display unit,
wherein the data fusion further comprises homogeneous fusion performed on the first detector data attributable to same detection media and same detection principles, and heterogeneous fusion performed on the first detector data attributable to different detection media and different detection principles.

19. The method of claim 18, wherein the primary and secondary warning messages are visual message or acoustic messages.

20. The method of claim 18, wherein the primary warning messages are radar charts.

21. The method of claim 19, wherein distances between the vehicle and the obstacles are denoted by colors in the radar charts.

22. The method of claim 20, wherein distances between the vehicle and the obstacles are denoted by numbers in the radar charts.

23. The method of claim 18, wherein the primary control module determines a movement direction of the vehicle according to the second detector data and then sends control signals according to the movement direction of the vehicle to a dynamic controller coupled to the primary control module so as to change the movement direction of the vehicle.

24. The method of claim 23, wherein the movement direction of the vehicle is determined by a neural-like network model.

25. The method of claim 18, wherein the detectors are selected from the group consisting of image detectors, supersonic radars, optical laser radars, millimeter wave/microwave radars and infrared radars.

26. The method of claim 18, wherein the primary control module further comprises:
two Internet domain controlling interfaces for controlling interfaces receives data from the detectors and sending control commands to the dynamic controller, respectively.

27. The method of claim 18, wherein the primary control module further comprises a digital signal transmission interface of UART, I2C and I2S for sending the secondary warning messages to the secondary display units.

28. The method of claim 18, wherein the primary control module further comprises an intra-vehicular communication network for sending and receiving the first detector data.

29. The method of claim 28, wherein each of the detectors has a unique transmission identification number for the primary control module to recognize each of the detectors.

30. The method of claim 29, wherein the intra-vehicular communication network is a CAN bus, and the transmission identification number is a CAN ID.

31. The method of claim 18, wherein the primary warning messages are displayed on the primary display unit by means of a display output interface of a digital or an analog video.

32. The surrounding environment detection method of claim 18, wherein the secondary warning messages are displayed on the secondary display unit by means of a display output interface of a digital or an analog video.

33. The method of claim 18, wherein the detectors are all-embedded detectors requiring no host computer to operate.

* * * * *